Sept. 16, 1958      B. D. PRIESTMAN      2,852,296
ROTARY GEAR BOLT DOOR LATCH
Filed Sept. 16, 1954      2 Sheets-Sheet 1
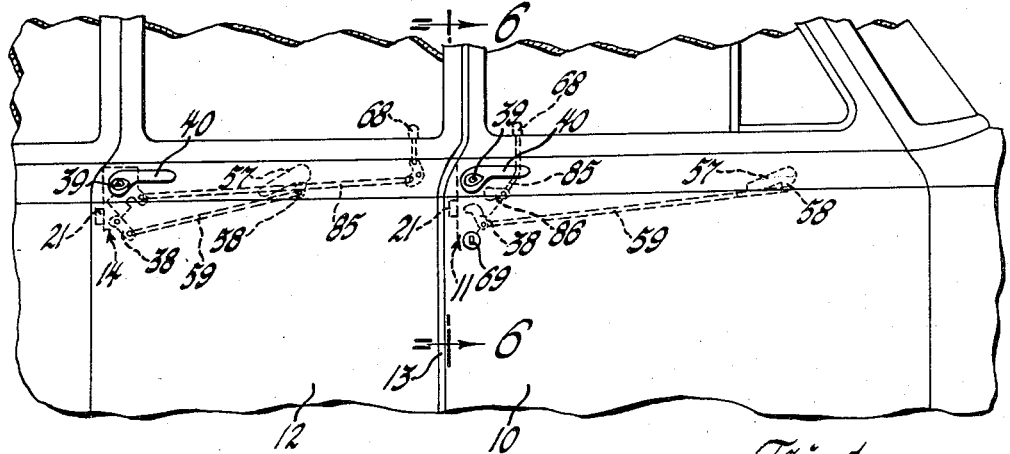
Fig.1
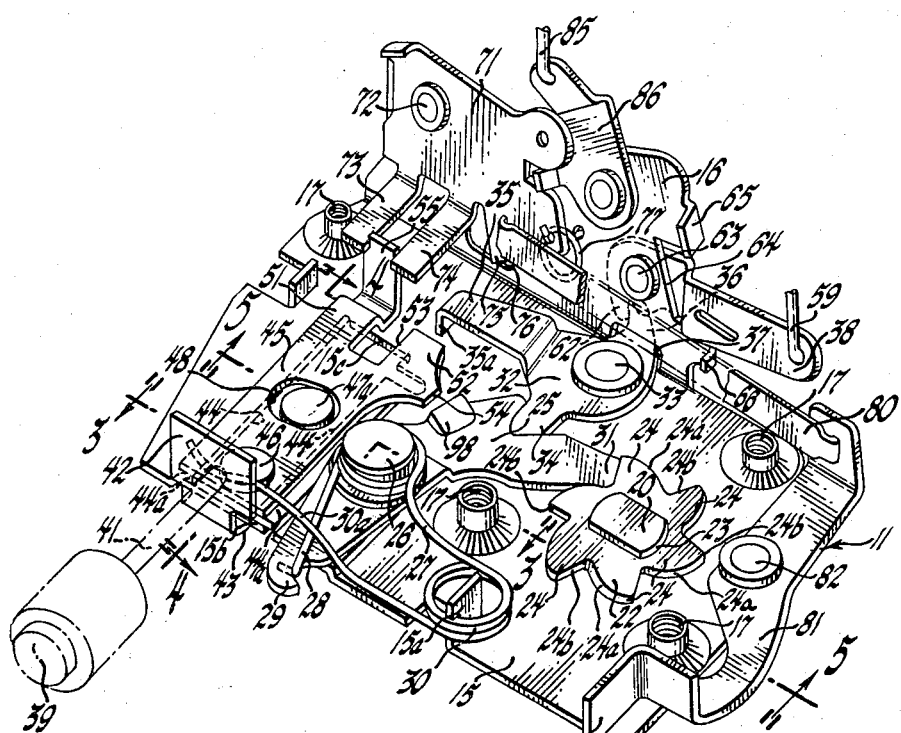
Fig.2
INVENTOR
Bewley D. Priestman
ATTORNEY Sept. 16, 1958  B. D. PRIESTMAN  2,852,296
ROTARY GEAR BOLT DOOR LATCH
Filed Sept. 16, 1954  2 Sheets-Sheet 2
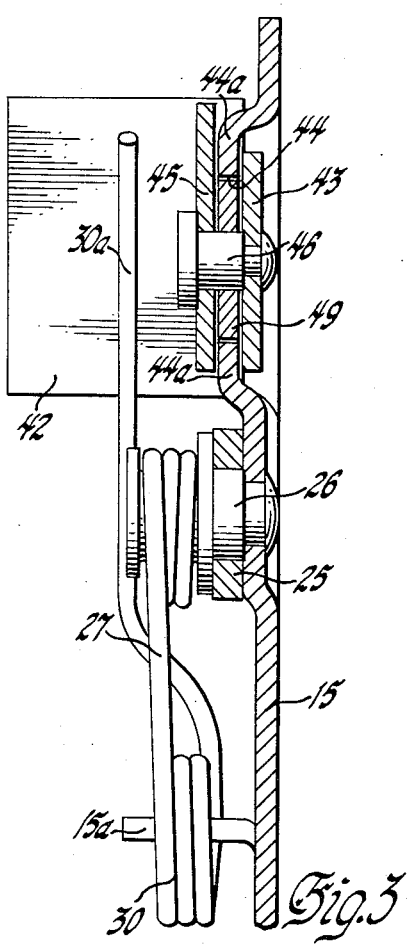
INVENTOR
Bewley D. Priestman
BY
Paul Fitzpatrick
ATTORNEY

United States Patent Office 2,852,296
Patented Sept. 16, 1958

2,852,296

ROTARY GEAR BOLT DOOR LATCH

Bewley D. Priestman, Livonia, Mich., assignor to General Motors Corporation, Detroit, Mich., a corporation of Delaware Application September 16, 1954, Serial No. 456,354

7 Claims. (Cl. 292—280)

This invention relates to a door latch, and more particularly to a rotary bolt door latch for an automobile.

In the copending application of James D. Leslie, entitled "Rotary Gear Bolt Door Latch," filed November 16, 1953, as Serial No. 392,266, a novel latch mechanism is disclosed and claimed, including latch release mechanism utilizing an intermittent link pivotally mounted on a push button lever which itself is pivoted on the lock frame. The link is shiftable upon pivoting the push button lever to operate a detent and release the latch bolt, and the link is pivotally swingable into and out of coupled relation with the detent for locking the door.

This invention provides an improvement over the latch structure shown in Serial No. 392,266 by eliminating the push button lever. According to this invention, the link is carried on a slide member which is movable along a rectilinear slot and track on the frame. By eliminating the elongated, pivoted push button lever, the latch is adapted to fit in a smaller space in the door. According to the invention, the slide member is slidable along a guide slot in the frame and the intermittent link is pivotally mounted on the slide member for pivotal movement between an operative position wherein the link is coupled to and is adapted to operate the detent upon sliding movement of the slide member, and an inoperative position wherein the link is uncoupled from the detent so that the door is locked and cannot be opened by actuation of the push button. In order to eliminate the possibility of binding, the slide is located on one side of the frame and the link is located on the other side of the frame, rollers being located in the guide slot between the slide member and the link. Stop means are provided on the frame for limiting sliding movement of the slide member.

Other features and advantages of the invention will be apparent from the following description and from the drawings, in which:

Fig. 1 is a fragmentary side elevational view of an automobile having the improved door latch therein;

Fig. 2 is an isometric view of the latch;

Fig. 3 is an enlarged fragmentary section through the latch taken along the line 3—3 of Fig. 2;

Fig. 4 is an enlarged fragmentary section through the latch taken along the line 4—4 of Fig. 2;

Fig. 5 is an enlarged fragmentary section through the latch taken along the line 5—5 of Fig. 2, and Fig. 6 is an enlarged section taken along the line 6—6 of Fig. 1 showing the bolt and keeper.

Referring now more particularly to the drawings, in Fig. 1 an automobile is shown having a front door 10 which is hinged at its front edge and which, adjacent its rear edge, carries a front door latch illustrated generally as 11. The automobile also has a rear door 12 which is hingedly mounted at its front edge on a door pillar 13 and which, adjacent its rear edge, carries a rear door latch 14. Only the front door latch 11 is illustrated in detail in Figs. 2-5. While the front and rear door latches are basically the same, the rear door latch may eliminate the means for locking with a key and may be modified by the addition of a protective "free wheeling" feature, as explained in detail in application Serial No. 392,266. The front door latch bolt engages a keeper on the door pillar 13 upon which the rear door is hingedly mounted, and a similar keeper is provided on the body for a rear door latch.

Referring to Figs. 2-6, the latch parts are mounted on a frame having a body or plate portion 15 which, when the latch is mounted on the door, lies in a plane generally parallel to the jamb edge of the door, and a right angle flange portion 16 which lies in a plane generally parallel to the inner door panel. The plate portion 15 has countersunk threaded openings 17 receiving screws for securing the latch frame to the jamb face of the door.

The latch bolt 18 is in the form of a gear having a plurality of symmetrical and equally spaced teeth 19, the bolt being mounted on the squared end of a shaft 20 which is rotatably mounted on the frame plate 13. A bolt housing 21 is riveted to the outer surface of the plate 15 and rotatably supports the outer end of shaft 20. The housing 21 and the bolt 18 project out of the door through an opening provided in the jamb edge thereof and the bolt and housing engage a conventional type of keeper 90 on the automobile body to hold the door latched.

On the inner surface of the plate 15 a cam 22 is fixedly mounted on the shaft 20, the end of the shaft being staked over at 23 to hold the parts in position. The bolt 18 and cam 22 are rigid with shaft 20 and the shaft is freely rotatable in the latch frame 15 and bolt housing 21.

Cam 22 has a plurality of equally spaced asymmetrical teeth 24 which are adapted to be engaged by a detent lever 25 to hold the bolt against rotation in one direction (counterclockwise as the parts appear in Fig. 2). The detent lever 25 is pivotally mounted upon a stud 26 which projects from the inner surface of plate 15, and a coil spring 27, which is mounted on the stud 26, has one end 28 hooked into an ear 29 on the free end of the detent. Another portion 30 of the spring is coiled around a tab 15a bent from the frame 15, and the spring biases the detent so that a foot 31 at the operating end of the detent is urged into engagement with the teeth of cam 22.

When the detent foot 31 is in engagement with the cam 22 as illustrated in Fig. 2, the door is held in latched position when closed. Of course, when the door is open, it may be closed without releasing the detent since the cam and bolt may rotate in a clockwise direction. Each of the cam teeth 24 is provided with a sloping cam surface 24a, and upon rotation of the cam and bolt in a clockwise direction, the detent foot 31 rides up over the sloping cam surface 24a; however, counterclockwise rotation of the cam and bolt is prevented by the generally radial but arcuate blocking surface 24b of each cam tooth.

In order to open the door, it is necessary to pivot the detent 25 in a counterclockwise direction (Fig. 2) to free the bolt for counterclockwise rotation. This pivotal movement of the detent is accomplished through a multiplier lever 32 which is pivoted on a stud 33 and which has a detent actuating arm 34 engaged in a recess in the detent lever. The multiplier lever 32 also has a second relatively long arm 35 for operation by means of an outside actuator and the lever 32 has a third relatively short arm 36 which extends through an opening 37 in the flange 16 for operation by an inside actuator 38.

The multiplier lever has several functions. In this latch, the detent is placed under compression by engagement with the cam, and therefore the detent pivot 26 is outboard of the cam 22 so that it is necessary to change the direction of the door opening force. This force is originally exerted on the push button in a direction inboard of the car and the multiplier lever changes the direction of the force to move the detent out of engagement with the cam tooth. The multiplier lever arm 36 also transmits and reverses the direction of motion of the inside actuator 38, and the lever 32 is so arranged that it permits "free wheeling" of an intermittent link when the door is locked, as will be hereinafter described.

Operation of the latch from outside the car is accomplished by means of a push button 39 (Figs. 1 and 2) which is slidable in a fixedly mounted handle 40 (Fig. 1) on the outer door panel. The push button acts through a push rod 41 which abuts a flange 42 turned from the outer end of a slide member 43. This slide is mounted for rectilinear sliding movement along tracks 44a formed at the edges of a guide slot 44 which extends inwardly from the outside edge of the body portion 15 of the frame. The slide 43 is mounted on the opposite side of the frame from the detent 25, and an intermittent link 45 is mounted on the slide member on the other side of the frame, the link 45 being on the same side of the frame as the detent. A rivet 46 extends through the slide 43, the guide slot 44 and the intermittent link 45 to mount the slide 43 for sliding movement along the slot 44 and to hold the intermittent link 45 pivotally on the slide 43. Another rivet 47 extends through the slide 43 and the guide slot 44 to hold the slide against pivotal movement. The head 47a of this rivet seats loosely in a transverse slot 48 in the intermittent link 45 to permit pivotal movement of the link on the slide. A roller 49 on the shank of rivet 46 and a similar roller 50 on the shank of rivet 47 provide anti-friction means for preventing jamming of the slide as it moves along the guide slot 44. A portion 30a of spring 27 extends up into engagement with the flange 42 on the slide to urge the slide member outwardly into engagement with the push button rod 41. If desired, instead of a single spring, separate springs may be used to bias the detent 25 and the slide 43. A tab 15b on the frame 15 extends into the open end of the slot 44 to provide an outer limit stop for the slide 43, the inner end 15c of the slot providing an inner limit stop.

The inner end of the intermittent link 45 is formed as a fork having spaced arms 51 and 52 separated by a slot 53. On the bottom of the arm 52 is a projection 54 which performs an undogging or unlocking function to be hereinafter described, and on the free arm 51 is a bent tab 55 which is part of the locking structure to be hereinafter described.

When the push button 39 is operated from outside the car to open the door, the push rod 41 acting against flange 42 on the slide 43 causes longitudinal sliding movement of the slide, which carries with it the intermittent link 45 so that the free end of arm 52 engages a bent tab 35a at the end of arm 35 of the multiplier lever 32, pivoting the multiplier lever in a clockwise direction and the detent lever 25 in a counterclockwise direction so that the detent foot 31 moves out of blocking relation with cam 22 and the bolt 18 is freely rotatable. With the parts in this position, the conventional resilient weatherstrip which seals the door will force the door open slightly.

The inside unlatching mechanism includes a remotely located inner turn handle 57 (Fig. 1) connected by a link 58 to a remote actuating rod 59. The rear end of this rod is connected to an arm of the remote lever 38 which is formed as a bell crank and is pivoted intermediate its ends on a stud 63 on the flange 16 of the latch frame. The other arm 62 of the remote lever extends adjacent arm 36 of multiplier lever 31. When the remote handle 57 is turned, lever 38 is pivoted in a counterclockwise direction (Fig. 2) to operate the multiplier lever 32 and the detent 25 and to free bolt 18. The remote lever operates in a recess 64 in the flange 16, and tabs 65 and 66 which are bent from the flange at opposite sides of the recess 64 provide stop means to limit the movement of the remote lever.

The latch may be locked from inside the car by means of a conventional garnish molding push button 68, or from outside the car by means of a conventional key actuated lock cylinder 69 (Fig. 1).

The locking means includes a trip lever 71 which is pivoted on the flange 16 on a rivet 72. The trip lever has spaced prongs 73 and 74 which are bent at right angles to lie in a plane parallel to the plate 15 and which straddle the tab 55 which is bent from intermittent link arm 51. The trip lever is movable about the axis of rivet 72 between an unlocked position (Fig. 2) and a locked position defined by a stop tab 75 which extends from lever 71 through a slot 76 in the flange 16. The opposite ends of the slot cooperate with the tab to stop movement of the trip lever, and an overcenter spring 77 holds the lever in either its locked or unlocked position. In Fig. 2, trip lever 71 is in unlocked position, holding the longitudinally and pivotally movable intermittent link 45 in a position wherein arm 52 thereof is aligned with the tab 35a on the multiplier lever arm 35. With the parts in this position, operation of the outside push button will move the detent 25 out of engagement with the cam 22. If the trip lever 71 is pivoted in a counterclockwise direction to its locked position, carrying with it intermittent link 45 so that arm 52 is out of alignment with tab 35a, then upon operation of the outside push button the intermittent link merely "free wheels," the tab 35a entering the slot 53 in the intermittent link.

In order to lock the door by means of a key from the outside, a connecting link 80 (Fig. 2) extends downwardly from the trip lever and is connected at its lower end to one end of a rockable locking lever 81 which is pivoted intermediate its ends on the plate 15 by means of a stud 82. The outer end of the locking lever has a flange 83 which is straddled by an actuator connected to the locking cylinder 69. When the door is locked by means of a key, the actuator is turned to rock the locking lever 81 in a clockwise direction, pulling down on the connecting link 80 and moving the trip lever 71 and link 45 to locked position.

In order to lock the door from inside the car, the garnish molding push button 68 is pushed down. The button 68 is connected to the trip lever 71 through an actuating rod 85 and a bell crank 86 so that the trip lever is moved between locked and unlocked positions by means of the garnish molding button.

In this latch, when the door is opened from the outside by actuation of the push button 39, only a relatively light opening push button pressure is necessary despite the fact that the door may be sealed with a pressure of the order of 100 pounds. This easy opening is due in part to the provision of the multiplier lever 32 between the intermittent link 43 and the detent lever 25, the multiplier lever providing a force multiplication factor of about two. Further, in order to move the detent foot 31 out of blocking relation to the cam 22, the detent is swung through an arc in a direction substantially at right angles to the direction of the force which the cam tooth exerts against the detent foot, and the only force which it is necessary to overcome is the frictional component between the end of the detent foot 31 and the abutting surface of the cam tooth. If it were necessary to operate the detent foot in a direction opposed to the direction of force which the cam tooth exerts, much more door opening pressure would be necessary.

A feature of operation of the latch is the provision of "automatic undogging" and "remote undogging" combined with keyless locking. Because of the automatic undogging feature, it is impossible for the operator to lock himself out of the car inadvertently because whenever the door is closed, the latch is automatically shifted to unlocked condition unless the operator consciously acts to obtain keyless locking. The tab 54 which projects from the bottom of the arm 52 of intermittent link 45 is adapted to abut a small projection 98 on the detent lever 25. Therefore, if the door is closed with the latch locked, counterclockwise pivotal movement of the detent as the bolt 18 rides over the keeper teeth will cause interengagement of the tab 54 and projection 98 to shift the intermittent link 43 and trip lever 71 to unlocked condition.

Similarly, by means of the remote undogging feature, the door may be opened through the inside handle regardless of whether the latch is in locked or unlocked condition. Operation of the remote handle moves the detent 25 through the multiplier lever 32 and the remote lever 38, so that the undogging projection 98 engages the tab 54 and shifts the parts to unlocked condition.

Despite the fact that normal closing of the door will automatically undog the latch or shift the parts to unlocked condition, the construction provides for keyless locking whenever the operator consciously desires to lock the door without using a key. In order to lock the door without a key, it is merely necessary to depress the garnish molding button 68 when the door is open, thus shifting the trip lever 71 and intermittent link 43 to locked condition and then to push in on the outside push button while the door is being closed. Operation of the outside push button shifts the intermittent link 45 longitudinally so that its undogging tab 54 is out of the path of movement of the projection 98 on the detent 25, and the parts are not shifted to unlocked condition upon counterclockwise pivotal movement of the detent lever.

While I have shown and described one embodiment of my invention, it is capable of many modifications. Changes, therefore, in the construction and arrangement may be made without departing from the spirit and scope of the invention as set forth in the appended claims.

I claim:

1. An automobile door latch of the character described, including: a latch frame having a body lying in a plane generally parallel to the jamb face of the door, said body having a slot therein; latching means pivotally mounted on said body; a detent movably mounted on said body and having a foot adapted to engage said latching means to block pivotal movement thereof in one direction; an operating slide member; means on the slide member projecting through said slot for mounting said slide member on one side of said body for sliding movement therealong, said slide member underlying said slot; an intermittent link carried on said slide member and overlying said slot, said intermittent link being mounted on the means projecting through the slot on the other side of said body from said slide member for pivotal movement between operative and inoperative positions, said link, when in operative position, being coupled to and adapted to operate the detent upon sliding movement of the slide member, and said link, when in inoperative position, being uncoupled from the detent; means for pivoting said link; and means for moving said slide member.

2. An automobile door latch of the character described, including: a latch frame having a body lying in a plane generally parallel to the jamb face of the door, said body having a slot therein; latching means pivotally mounted on said body; a detent movably mounted on said body and having a foot adapted to engage said latching means to block pivotal movement thereof in one direction; an operating slide member; means on the slide member projecting through said slot for mounting said slide member on the opposite side of said body from said detent for sliding movement along the body, said slide member underlying said slot; an intermittent link carried on said slide member and overlying said slot, said intermittent link being mounted on the means projecting through the slot on the same side of said body as said detent for pivotal movement between operative and inoperative positions, said link, when in operative position, being coupled to and adapted to operate the detent upon sliding movement of the slide member, and said link, when in inoperative position, being uncoupled from the detent; means for pivoting said link; and means having only abutting contact with said slide member for moving said slide member.

3. An automobile door latch of the character described, including: a latch frame having a body lying in a plane generally parallel to the jamb face of the door, said body having an elongated slot therein; latching means pivotally mounted on said body; a detent movably mounted on said body and having a foot adapted to engage said latching means to block pivotal movement thereof in one direction; an operating slide member; means on the slide member projecting through said slot for mounting said slide member for rectilinear sliding movement on the opposite side of said body from said detent, said slide member underlying said slot; an intermittent link carried on said slide member and overlying said slot, said intermittent link being mounted on the means projecting through the slot on the same side of said body as said detent for pivotal movement between operative and inoperative position, said link, when in operative position, being coupled to and adapted to operate the detent upon sliding movement of the slide member, and said link, when in inoperative position being uncoupled from the detent; first means operable from outside the door for pivoting said link; second means operative from inside the door for pivoting said link; and means having only abutting contact with said slide member for moving said slide member.

4. Apparatus of the character claimed in claim 3, wherein the means operable from outside the door and the means operable from inside the door are coupled to said link through a common operating member.

5. Apparatus of the character claimed in claim 3, wherein the means projecting through said slot include rollers in the slot in the plane of said body for guiding movement of the slide member.

6. An automobile door latch of the character described, including: a latch frame having a body lying in a plane generally parallel to the jamb face of the door, said body having an elongated slot therein; latching means pivotally mounted on said body; a detent movably mounted on said body and having a foot adapted to engage said latching means to block pivotal movement thereof in one direction; an operating slide member; means on the slide member projecting through said slot for mounting said slide member on one side of said body for sliding movement therealong, said slide member underlying said slot and said means including spaced rollers in the slot in the plane of said body for guiding and facilitating movement of the slide member on the body; an intermittent link carried on said slide member and overlying said slot, said intermittent link being mounted adjacent one end thereof on the means projecting through the slot on the other side of said body from said slide member for pivotal movement between operative and inoperative positions, said link, when in operative position, being coupled to and adapted to operate the detent upon sliding movement of the slide member, and said link, when in inoperative position, being uncoupled from the detent; a locking member pivotally mounted on said latch frame and slidingly coupled to said link adjacent the other end thereof; first means operable from outside the door for pivoting said link, said first means being connected to said locking member; second means operable from inside the door for pivoting said link, said second means being connected to said locking member; and means having only abutting contact with said slide member for moving said slide member.

7. Apparatus of the character claimed in claim 6, wherein said slot extends from the outside edge of said body portion toward the inside of said door, and wherein said slot is provided with tracks formed along its opposite sides for guiding said slide member.

References Cited in the file of this patent

UNITED STATES PATENTS

| | | |
|---|---|---|
| 2,221,181 | Dall | Nov. 12, 1940 |
| 2,680,037 | Marple | June 1, 1954 |
| 2,705,884 | Craig | Apr. 12, 1955 |
| 2,728,214 | Craig | Dec. 27, 1955 |